United States Patent [19]
Roe

[11] 3,806,043
[45] Apr. 23, 1974

[54] TALC BENEFICIATING PROCESS
[75] Inventor: Lawrence A. Roe, Norwalk, Conn.
[73] Assignee: R. T. Vanderbilt Company, Inc., New York, N.Y.
[22] Filed: Feb. 22, 1973
[21] Appl. No.: 334,929

[52] U.S. Cl. .................................... 241/4, 241/24
[51] Int. Cl. .............................................. B02c 19/12
[58] Field of Search .................... 241/4, 20, 21, 24

[56] References Cited
UNITED STATES PATENTS
3,414,201  12/1968  Bixby ..................................... 241/4
3,599,879  8/1971  Clark ..................................... 241/20
3,608,835  9/1971  Ruzicka ................................. 241/24

Primary Examiner—Granville Y. Custer, Jr.
Attorney, Agent, or Firm—Brumbaugh, Graves, Donohue & Raymond

[57] ABSTRACT

The specification relates to a process for beneficiating talc by mixing crude talc ore with deionized water to form a slurry and effecting sedimentation of the gangue therein to provide recovery of talc in the platy form.

10 Claims, No Drawings

TALC BENEFICIATING PROCESS

BACKGROUND OF THE INVENTION

It is known that talc, a hydrous magnesium silicate mineral, is found usually in its natural state in one or more of its three major forms, i.e., platy or laminar shaped, granular, and acicular, depending upon its geographical location. It is known also that talc occurs rarely in the pure state since other minerals, such as dolomite (calcium magnesium carbonate) and tremolite (hydrated calcium magnesium silicate) are present in the deposit.

The preferred talc for many commercial uses is the platy form. In order to achieve a higher percentage of talc in this form, it is necessary generally to process the talc to separate the platy talc from the gangue; this is known in the art as talc beneficiation. As defined herein, "gangue" includes other forms of talc and other mineral components, such as dolomite and tremolite.

Platy talc is employed advantageously in high-grade cosmetic powder; there is a natural lubricity due to the sliding action of the platy talc. The presence of even small amounts of granular talc or other minerals, however, is apparent to the user of cosmetic talc products. Merely by rubbing a pinch of talc powder between the thumb and forefinger, the user can notice the gritty feeling of a cosmetic powder containing only a few percent of non-platy talc. Furthermore, it is desirable in the cosmetic industry to remove certain metals, such as arsenic and lead, from talc for health safety reasons in accordance with the standards developed by Cosmetic, Toiletries and Fragrance Assocation, Inc.

In the paper industry, granular talc and grit must be removed from platy talc products in order to provide a pigment or coating with low abrasion properties. The industry has established the Valley Abrasion specification for pigments and fillers to prevent and control, firstly, the abrasive characteristics of finished paper and, secondly, undue wear of Fourdrinier wire used in the paper-making process. The abrasiveness of paper is deleterious because of the wear on converting and printing equipment. Moreover, the costly replacement of abraded Fourdrinier wire should be minimized.

The presence of a significant quantity of dolomite in commercial talc is also undesirable in the paper industry when the product is introduced into the wet end of the process as a pigment or pigment extender. In the normal wet process for paper making, excess alum is added to neutralize sodium rosinate sizing and to provide a stabilized system with a pH of 4 to 5. Sodium rosinate, when reacted with alum, imparts water resistance to the paper matrix, and it serves also as a retention aid for pigments and fillers. The presence of carbonates, such as dolomite, buffers the alum reaction and this reduces sizing and retention.

Another use for beneficiated talc is a filler or opacifier for various polymers, such as polyvinyl chloride. When these polymers are employed as wire coatings, the removal of excess sodium and potassium ions, as well as extraneous iron particles contributed by initial handling, improves in the electrical resistance of these coatings and thereby enhances the insulating properties of the coatings. In this and other uses, the ionic impurities contributed by a talc filler or opacifier may cause catalytic degradation of polyvinyl chloride polymers and the like. It is, therefore, desirable to utilize only the purest talcs, i.e., those free from all excess sodium, potassium or calcium ions and small particles of iron or iron salts.

The paint industry has used talc extensively as a dulling agent for enamels and as a filler or pigment for many types of paints. In enamel dulling, a high oil absorption property of beneficiated talc, i.e., talc containing a high proportion of platy talc, means that less filler is required to effect the desired dulling. Furthermore, platy talc fillers enhance the efficiency of titanium dioxide pigments in flat white paints and contribute to a better reinforced film which improves weather and corrosion resistance in exterior paints.

In most applications where reflectance, aesthetic appearance and the like are paramount considerations, it is highly desirable also to employ a beneficiated talc which is as white as possible.

In the past, talc beneficiation has been accomplished by either a dry process or a wet process. The dry talc process (U.S. Pat. No. 3,414,201) uses air separation or pneumatic classification to obtain beneficiation. However, it is difficult to effect precise separation of a typical talc ore containing several distinct mineral components which have similar specific gravities.

The previously known wet processes for talc beneficiation (U. S. Pat. Nos. 3,102,855, 3,102,856, 3,459,299 and 3,684,197) frequently utilize some sort of froth flotation method. There are several serious disadvantages in regard to this method. Firstly, in order to achieve a satisfactory separation of platy talc from the gangue, it is necessary to grind the talc ore using roller mills, jet mills, hammer mills or the like with a significant quantity of the particles being reduced to smaller than 10–15 microns. This is undesirable because the force applied by the grinding leads to a three dimensional size reduction in the talc plates. Not only is the thickness of the plate reduced as the talc is delaminated, but the planar dimensions of the talc are also reduced. Since the lubricity of the talc is a function of the ratio of plate thickness to planar surface, a decrease in the planar dimensions leads to decreases in desired lubricity.

A second disadvantage in some froth flotation methods is having to remove before flotation a substantial portion of particles smaller than 10–15 microns. This necessitates additional equipment and provides a lower yield of finished product. Furthermore, in some methods the crushed ore prior to flotation may have to be wet-milled in order to prevent smearing or coating of the gangue by talc. The amount of grinding necessary to achieve froth flotation reduces also the gangue minerals to a superfine particle size which makes separation more difficult.

The large amounts of frothing agents used in most froth flotation methods is another disadvantage. This adds to the cost of separation, and it requires thorough washing during the dewatering process in order to ensure a final product free of extraneous residues.

Still another disadvantage in the flotation method is having to control the pH within narrow limits to assure satisfactory separation of the different talc forms. This demands more costly controls. With dolomite containing talc ores, this leads also to a certain amount of dissolution of the dolomite which requires washing soluble salts from the recovered product during the dewatering step.

Dilution is a further disadvantage of the flotation method. Low concentration talc slurries are fed to the flotation cell, ranging from about 8 percent solids for an ore with high initial platy talc content to about 13% for one with a low initial platy talc content. This large quantity of water increases the cost of the method since the water must be removed subsequently during dewatering and drying.

SUMMARY OF THE INVENTION

It has now been discovered that these disadvantages can be overcome by employing the process of this invention. Thus, in accordance with one embodiment of the present invention, crude talc ore crushed to a relatively large particle size and dionized water are mixed in an attrition or scrubbing zone with or without a dispersing agent to form a slurry. Additional deionized water is incorporated into the slurry to effect sedimentation of the undesirable components, such as dolomite and tremolite. The resulting overflow contains a talc product which after recovery contains no more than about 4% dolomite based on carbonate content and contains no tremolite by x-ray diffraction analysis.

DETAILED DESCRIPTION OF THE INVENTION

Talc mined as an ore is well known in the art. When theoretically pure, talc has the formula $H_2Mg_3(SiO_3)_4$ or $3MgO \cdot 4SiO_2 \cdot H_2O$. The naturally occurring ore has talc mixed usually with varying and sometimes large percentages of accessory minerals, such as tremolite, dolomite, serpentine, anthophyllite, magnesite, calcite, diopside, chlorite and quartz. Furthermore, it generally contains iron-containing minerals and other metallic components. The ore may vary in color from various shades of gray and pale green to snow white. As defined herein, "talc ore" comprises platy talc with or without other forms of talc in conjunction with some tremolite or some carbonate minerals or both of these impurities and any other impurities normally found therein. The carbonate mineral includes, among others, dolomite, calcite ($CaCO_3$) and magnesite ($MgCO_3$).

In the present invention, the talc ore must be crushed initially to provide a feed material with an average size between about ⅛ and 1 inch. The preferred average size is 1 inch. With a larger average size, it is difficult in a subsequent step to secure acceptable scrubbing and attrition action and there is the possibility of occluding talc within dolomite formations. With a smaller average size, the carbonate minerals, e.g., dolomite or the like, subsequently may remain suspended and during recovery may be removed with the talc. Any type of conventional comminution equipment can be employed to crush the ore to the proper size. However, it is preferred to use a jaw crusher set at 1 inch.

Besides the crushed talc ore, deionized water is fed to the attrition or scrubbing zone. An important feature of the invention is maintaining as a slurry an optimum dispersion of the talc in water during the subsequent sedimentation step. With too much dispersion undesirable dolomite fines are recovered with the talc; with too little dispersion, i.e., some degree of flocculation, less talc is recovered from the starting ore.

To arrive at this optimum dispersion, it is necessary to test the various sources of water, e.g., well water, city water, etc., before use to ascertain the nature of the dispersion obtained therefrom by scrubbing a talc ore. In some instances, water must be treated first in order to provide a satisfactory talc dispersion even though the water is considered "soft" by ordinary standards; without the pretreatment the water may cause the talc to flocculate. Other water may require treatment although it is deemed to be "hard." Some water, however, requires no further treatment to form subsequently the optimum dispersion heretofore described. As defined herein, "deionized water" is either untreated water or treated water which provides the aforementioned optimum dispersion.

Any method can be used to treat water if it is required. For instance, a treating unit can consist of two 55 gallon steel drums connected in series with Calgon C-300 cation exchange resin in a first drum and Rohm & Haas IRA 410 anion exchange resin in a second drum and untreated water can be percolated through each resin in series.

The mixture of crushed ore and deionized water for the attrition or scrubbing step should have a concentration of about 30 to 50 percent solids and this percentage includes the gangue. Higher concentrations of solids may form talc slurries which are too thick to handle. Lower concentrations require excessive amounts of water. A preferred charge is about 1,000 lbs. of crushed ore mixed with about 120 gallons of deionized water; this affords a solids concentration of about 50 percent.

The purpose of the attrition or scrubbing step is to separate without sedimentation the platy talc from the gangue, such as dolomite. This results in a slurry, i.e., a dispersion of talc in water. Only gentle stirring or the like is required to accomplish this separation; thus, the planar dimensions of the platy talc particles are not disturbed. Furthermore, this separation occurs without a flotation phenomenon, and there is no flocculation casued by any deleterious ions in the water.

It is preferred, although not necessary, to prepare a slurry and the resulting talc product without any dispersing agents therein. As defined herein "dispersing agent" is any component which assists in maintaining the talc in a slurry form and includes such categories as dispersants, suspending agents, deflocculating agents, frothing agents and the like. If a dispersing agent is present, it may be deleterious for some commercial uses of the talc, e.g., polymer fillers or paper pigments. In these and other instances, the dispersing agent must be removed from the talc by means of an expensive washing step.

In accordance with the present invention, it is not necessary to control the pH of the slurry. Since dolomite is present, the slurry is alkaline. Therefore, carbonate does not dissolve in the slurry, and it does not remain in the talc requiring subsequent removal by washing.

The next step in the process is the sedimentation step. The purpose of this step is to remove by sedimentation the gangue, e.g., dolomite and tremolite, from the platy talc. Additional deionized water is combined with the slurry as required to provide a concentration of between about 12 and 35 percent solids. This solids content excludes the gangue, e.g., dolomite, tailings that have settled to the bottom of the tank. A preferred concentration is about 20 percent solids.

The settling time in the sedimentation step may vary over a wide range, e.g., about 1 minute to 1 hour. It depends in part upon the solids content in the slurry. After settling, the talc remaining in the slurry is recovered as an overflow. One method of determining the optimum settling time is to monitor the $CO_2$ content of dried talc from the overflow. When the $CO_2$ in the dried product is about 2 percent which corresponds to about 4 percent carbonate present as dolomite, the sedimentation step has been completed and the talc in the overflow can be recovered.

Although the sedimentation can be effected in one cycle, it may be preferred under certain circumstances to employ a series of sedimentation cycles, e.g., two cycles, following a simlar procedure heretofore described. A subsequent cycle, however, results in a lower concentration of talc in the overflow product than the one in the previous step. The concentration of the talc in the overflow ranges from about 2 to 22 percent solids depending on the number of sedimentation cycles employed.

The talc in the overflow is recovered by any suitable procedure. These recovery procedures are well known in the art. For instance, the overflow talc product may be passed through a vibrating screen to remove oversized particles. The talc slurry from the overflow, with or without screening, may be thickened by being introduced into settling tanks for several hours up to several days. Here, water is removed as overflow and the concentration of the slurry is increased. Further dewatering of the slurry can be accomplished by using a centrifuge, drum-type filter or the like. Then drying can be performed in a spray dryer, flash dryer, jet mill or the like.

The end product resulting from the product of this invention is a talc which is free from tremolite and which has no more than about 4 percent carbonate minerals. This talc can be used advantageously in cosmetics, paper, paints, polymers and the like.

The following example is submitted to illustrate but not to limit this invention. Unless otherwise indicated, all parts and percentages in the specification and claims are based upon weight.

EXAMPLE 1

A 50 ton crude talc ore sample from a talc mine located in the Death Valley Region of Southeastern California was processed in accordance with the invention. The crude talc ore was gray. The principal gangue mineral was dolomite, and other gangue minerals, without limitation, were calcite, serpentine, mica, chert, tremolite, iron oxides and clay. The chemical analysis was as follows:

|  | % |
|---|---|
| CaO | 14.63 |
| MgO | 26.84 |
| $SiO_2$ | 32.84 |
| $Fe_2O_3$ | 0.25 |
| $Na_2O$ | 1.32 |
| $K_2O$ | 0.68 |
| $Al_2O_3$ | 0.67 |
| $CO_2$ | 20.90 |
| Carbonate minerals | 48.00 |
| Loss on ignition | 24.45 |
| Total arsenic | (0.91 ppm) |
| Total lead | (29 ppm) |

The crude talc ore was subjected to a mine jaw crusher. The crushed product had a nominal minus one inch particle size. The tabular nature of some of the dolomite caused particles up to two inches in length to remain in the product, although the jaw setting on the crusher was one inch.

A 330 gallon stainless steel tank fitted with two Lightnin stirrers (each equipped with 10 inches double props, rotating at 420 rpm) was charged with 120 gallons of deionized water. With stirring, approximately 1,000 lbs. of the aforementioned crushed crude ore was fed to the tank by means of a belt conveyor. A concentration of 30 percent solids including gangue was recorded at the completion of the ore addition. The resulting slurry was mixed gently with stirrers for a 5 minute period, with occasional manual mixing of coarse solids which were built up along the bottom rim of the tank.

After the attrition period, the slurry was diluted to 22 percent solids (exluding the weight of settled gangue) with deionized water and it was allowed to settle for 10 minutes. A first overflow was then siphoned from the tank by means of a ¾ inch interior diameter plastic pipe. The lower end of the pipe within the settling tank was suspended, throughout the siphoning operation, 4 inches below the surface of the slurry by means of a floating device. Siphoning was continued until the lower end of the pipe was within 4 inches of the solid tailing in the bottom of the tank. The overflow product was passed over a vibrating 150-mesh screen, in order to remove extraneous material, and collected in a holding tank. The concentration of the product of the first overflow was 18 percent solids.

A second sedimentation step was performed by adding more deionized water to the attrition tank, with stirring, until the concentration was approximately 17 percent solids. The slurry was stirred for one minute, and then allowed to settle for 10 minutes. A second overflow was siphoned off in the same manner as described heretofore above, passed over the vibrating screen and combined with the overflow from the first sedimentation step. The concentration of the second overflow product was 9.8 percent solids.

The combined overflow slurries were allowed to settle in glass-lined or plastic tanks for periods of up to several days. The slurry was thickened to 25 percent solids after standing for 24 hours, and up to 40 percent solids after standing for 3 days. The slightly cloudy supernatant liquid was siphoned off and discarded before filtration.

The subsequent dewatering of the thickened slurries was accomplished by the use of a centrifuge. Centrifuge cakes of 60 percent solids were recovered. The product from the centrifuge was spray dried.

Analysis of the spray dried talc was as follows:

|  | % |
|---|---|
| CaO | 1.38 |
| MgO | 34.94 |
| $SiO_2$ | 57.41 |
| $Fe_2O_3$ | 0.21 |
| $Na_2O$ | 0.60 |
| $K_2O$ | 0.65 |
| $Al_2O_3$ | 1.00 |
| $CO_2$ | 1.70 |
| Carbonate minerals | 4 |
| Loss on Ignition | 6.48 |
| Total Arsenic | (0.59 ppm) |
| Total Lead | (15 ppm) |

An ore containing 20.9 percent carbon dioxide by analysis (corresponding to about 48 percent carbonate minerals) was beneficiated to produce the above talc product analyzing 1.7 percent carbon dioxide (corresponding to about 4 percent carbonate minerals).

The physical properties of the talc before and after beneficiation are as follows:

|                              | Before    | After        |
|------------------------------|-----------|--------------|
| G-E Brightness Value[a]      | 86–87     | 93–95        |
| Valley Abrasion Value[b]     | 15–20     | 4            |
| Bulk Density (lbs./cu.ft.)   | 13        | 16.3         |
| Tremolite[c]                 | 5–10%     | 0%           |
| Specific Resistance[d]       | 3550 Ohms-cm | 3700–4500 Ohms-cm. |
| Oil Absorption[e]            | 21        | 47           |
| Carbonate mineral content[f] | 48%       | 4%           |

(a) Measured at 457 millimicrons, using MgO as 100%.
(b) Determined with the Valley Iron Works Abrasion Tester and expressed as milligrams of wire cloth lost.
(c) By x-ray diffraction analysis.
(d) ASTM Method D2448-68.
(e) ASTM Method D281-31.
(f) Calculated as dolomite.

Having set forth the general nature and specific embodiments of the present invention, the true scope is now particularly pointed out in the appended claims.

What is claimed is:

1. A process for providing a talc product which comprises crushing a talc ore comprising platy talc and gangue to an average size between ⅛ and 1 inch; mixing the crushed talc ore with deionized water in an attrition zone to form a slurry; removing by sedimentation the gangue from the platy talc; and recovering the platy talc as a product which is substantially free from tremolite and which has no more than about 4 percent carbonate minerals.

2. The process according to claim 1 in which the talc ore comprises platy talc and a gangue selected from the group consisting of tremolite, dolomite and mixtures thereof.

3. The process according to claim 1 in which the slurry in the attrition zone is a dispersion having about 30 to 50 percent solids.

4. The process according to claim 1 in which the slurry in the attrition zone is free from a dispersing agent.

5. The process according to claim 1 in which additional deionized water is combined with the slurry during sedimentation to provide a concentration of between about 12 and 35 percent solids.

6. The process according to claim 1 in which the sedimentation is effected in one cycle.

7. The process according to claim 1 in which the sedimentation is effected in more than one cycle.

8. The process according to claim 1 in which the platy talc is recovered as an overflow from the sedimentation with a concentration between about 2 to 22 percent solids.

9. The process according to claim 1 in which the platy talc is recovered as an overflow from the sedimentation and subsequently thickened and dried.

10. A product prepared by the process of claim 1.

* * * * *